UNITED STATES PATENT OFFICE.

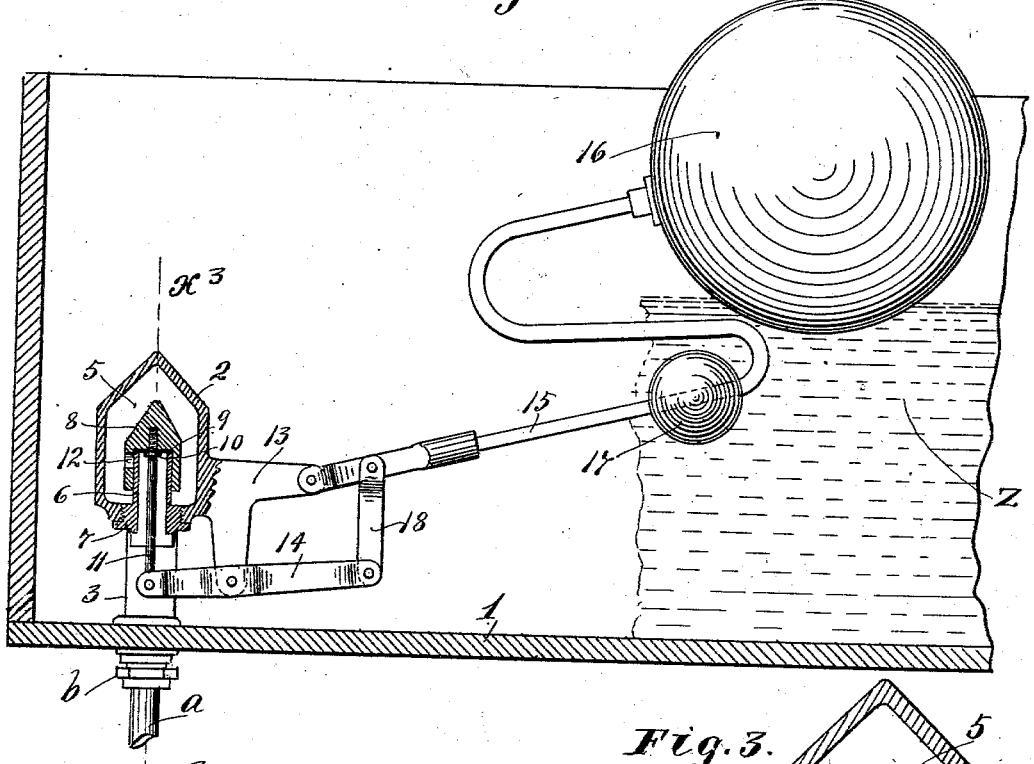

ARRESTIDE CARON, OF MINNEAPOLIS, MINNESOTA

FLOAT-CONTROLLED VALVE.

SPECIFICATION forming part of Letters Patent No. 721,938, dated March 3, 1903.

Application filed February 24, 1902. Serial No. 95,185. (No model.)

*To all whom it may concern:*

Be it known that I, ARRESTIDE CARON, a citizen of the United States, residing at Minneapolis, in the county of Hennepin and State of Minnesota, have invented certain new and useful Improvements in Float-Controlled Valves; and I do hereby declare the following to be a full, clear, and exact description of the invention, such as will enable others skilled in the art to which it appertains to make and use the same.

My invention has for its object to provide an improved float-controlled valve for flushing-tanks; and to this end it consists of the novel devices and combinations of devices hereinafter described, and defined in the claims.

The invention is illustrated in the accompanying drawings, wherein like characters indicate like parts throughout the several views.

Figure 1 is a view, principally in section, illustrating my improved valve applied in operative position within a flushing-tank. Fig. 2 is a view corresponding to Fig. 1, but with some parts broken away and others removed, showing the cut-off valve in its opened position. Fig. 3 is a vertical section taken transversely on the line $x^3$ $x^3$ of Fig. 1, and Fig. 4 is a horizontal section taken on the line $x^4$ $x^4$ of Fig. 3.

The numeral 1 indicates an ordinary flushing-tank, and the character $z$ indicates a body of water therein.

The numeral 2 indicates a valve-casing, the supply-stem 3 of which is bent laterally and then downward and connected with the supply-pipe $a$ by a union $b$. Said stem 3 passes through the bottom of the tank 1 and is connected therewith by a water-tight packing in the ordinary way. In some constructions, however, the stem 3 will be passed outward through the side of the flushing-tank.

The lower end of the valve casing or head 2 is provided with an axial passage, which in horizontal line with the water-inlet port $3^a$ of the supply-stem 3 is formed with diametrically opposite and inwardly-projecting segmental valve-seats 4, through one of which the said port $3^a$ opens inward. Between the segmental valve-seats 4 are formed recesses or passages $4^a$, which lead upward to a chamber 5, formed in said casing 2. A detachable cylindrical or sleeve-like valve-seat 6 is secured to or formed integral with a hollow nut or plug 7, which is screw-threaded into the lower open end of the axial passage of the said valve-casing 2. When this valve-seat 6 is located in working position, it stands concentric with the cylindrical surfaces in the segmental valve-seats 4, but is spaced apart inward therefrom.

The numeral 8 indicates an inverted-cup-shaped valve which telescopes over the open upper end of the inner valve-seat 6 and works between the same and the segmental valve-seats 4. The fit between the sides of this cut-off valve 8 and the segmental seats 4 is such that a slow leakage may always take place between the same, thereby permitting a slow flow of water from the inlet-port $3^a$ to the chamber 5 even when the said valve 8 is lowered far enough to overlap the said port. In the inverted bottom of the valve 8 is a valve-surface, preferably afforded by a leather disk 9, which is detachably held in place by the collar 10 of a valve-stem 11, which is screw-threaded into the head of said valve. When the said valve 8 is moved downward slightly farther than required to overlap the port $3^a$, this disk 9 is forced against the open upper end of the cylindrical valve-seat 6 and tightly closes the same. In its side just below said disk 9 the valve 8 is provided with a lateral opening or port 12, which always opens into the chamber 5 through one or the other of the segmental passages $4^a$, according to the position in which it may be set on the valve-stem 11. It will be noted that both the head of the valve 8 and the top of the valve-casing 2 are of conical form.

The valve-casing 2 is shown as provided with a laterally-projecting two-armed bracket 13, to one arm of which is pivoted an intermediate lever 14 and to the other arm of which is pivoted the stem 15 of a float 16. The stem 15 is shown as bent in the form of a letter S, and it is provided with a weight 17. One end of the lever 14 is connected to the stem 15 by a link 18, and the other end thereof is connected to a flattened and perforated lower end 19 of the valve-stem 11, in such manner that the said valve-stem, and consequently the valve 8, carried thereby, are held against rotation.

The operation of the valve is as follows: When the water rises within the tank, it will raise the float 16 and through the connections described will force downward the cut-off valve 8 and hold the same in its closed position, (indicated in Figs. 1 and 3,) in which position the disk 9 is tightly pressed against the opened upper end of the valve-seat 6, thereby cutting off all flow of water into the said tank. When the water is by the flushing-valve or other device (not shown) caused to lower, the float will drop and the said cut-off valve will be raised into the position indicated in Fig. 2. In this position of the valve the water flows freely inward through the port $3^a$ into the segmental passages $4^a$, from thence upward into the chamber 5, and from thence through the valve-port 12 outward and downward through the cylindrical valve-seat 6. As the cut-off valve is moved downward it gradually closes the water-inlet port $3^a$ and finally completely overlaps the same. This takes place before the disk 9 is moved into engagement with the upper end of the valve-seat 6, and leakage between said valve and the segmental valve-seats 4 is then relied upon to gradually complete the closing movement of the valve—that is, to slowly let in enough water to further raise the float 16 and complete the closing movement of the valve.

The above is an action extremely desirable in valves of this character. This valve, it will be noted, closes with and not against the pressure of the inflowing water, and at the same time its closing movement is kept under perfect control, and it is caused to complete its closing movement slowly and without any pounding action whatever.

Hitherto great difficulty has been experienced in properly controlling the movements of valves of this character when arranged to close with the pressure of the flowing water, inasmuch as their tendency has been to be prematurely closed with a snap or jump under the pressure of the water. This difficulty, as above stated, I have entirely overcome.

As is evident, the water within the chamber 5 can rise only to a limited extent, and hence an air-cushion will be formed within said chamber above the water. This is important, as it renders the opening of the cut-off valve quick and easy. The conical form of the head of the said valve also contributes to secure this result.

It is important to note that the cylindrical valve-seat 6 being detachable may be readily removed, in case the same becomes worn, and a new valve-seat substituted therefor. This enables the valve to be quickly repaired at a very small cost.

It will of course be understood that the valve above described is capable of considerable modification within the scope of my invention as herein set forth and claimed.

What I claim, and desire to secure by Letters Patent of the United States, is as follows:

1. The combination with a valve-casing having a segmental valve-seat with an inlet-port opening therethrough and with a chamber above said valve-seat, of a cylindrical valve-seat located concentric with said segmental valve-seat, and an inverted cup-like valve working between said valve-seats and provided with a lateral opening and with an internal valve surface or portion adapted to open and close the inner end of said cylindrical valve-seat, substantially as described.

2. The combination with a valve-casing having a segmental valve-seat and supply-port opening thereinto and provided with a chamber above said valve-seat, of a detachably-securable cylindrical valve-seat located concentric to said segmental valve-seat, and an inverted cup-like valve working between said two valve-seats and provided with a lateral opening always in communication with the said chamber and provided with a valve surface or element, adapted to open and close the inner end of said detachable cylindrical valve-seat, substantially as described.

3. The combination with the valve-casing 2 having the inlet-port $3^a$, segmental valve-seats 4, segmental passages $4^a$ and chamber 5, of the hollow plug 7 screw-threaded into the lower end of said valve-seat and provided with the inwardly-projecting cylindrical valve-seat 6, and the cut-off valve 8 working between said valve-seats 4 and 6 and provided with an interior valve disk or packing 9, substantially as described.

4. The combination with the valve-casing 2 with inlet-port $3^a$, segmental valve-seats 4, segmental passages $4^a$ and chamber 5, of the hollow plug 7 screw-threaded into the lower end of said valve-casing and provided with the inwardly-projecting cylindrical valve-seat 6, the cut-off valve 8 working between said valve-seats 4 and 6 and provided with the lateral opening 12, the valve-disk 9 located within said valve 8, and the valve-stem 11 working axially through said valve-seat 6 and nut 7, screw-threaded at its upper end for engagement with the head of said valve 8 and provided with the collar or shoulder 10 for detachably clamping said disk 9 to said valve, substantially as described.

5. The combination with a valve-casing having an inwardly-projecting cylindrical valve-seat and a laterally-opening inlet-port, of a cup-shaped valve telescoping over said cylindrical valve-seat with its bottom or closed end engaging the inner end of said valve-seat to open and close the same, and with its flange coöperating with said lateral inlet-port, and an air-chamber located above said valve and opening to the same and constituting an intermediate portion of the main water-passage between said inlet-port and the passage through said cylindrical valve-seat.

In testimony whereof I affix my signature in presence of two witnesses.

ARRESTIDE CARON.

Witnesses:
ELIZABETH H. KELIHER,
F. D. MERCHANT.